(12) United States Patent
Komai

(10) Patent No.: US 7,079,922 B2
(45) Date of Patent: Jul. 18, 2006

(54) CERTIFICATION SYSTEM, CERTIFICATION APPARATUS, AND CERTIFICATION METHOD

(75) Inventor: Shinsui Komai, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/341,486

(22) Filed: Jan. 13, 2003

(65) Prior Publication Data

US 2003/0154170 A1    Aug. 14, 2003

(30) Foreign Application Priority Data

Jan. 15, 2002  (JP) .............................. 2002-006770

(51) Int. Cl.
  *G06F 17/00*    (2006.01)
(52) U.S. Cl. ..................... 700/237; 700/241; 700/244; 455/420
(58) Field of Classification Search ................ 700/231, 700/232, 237, 241; 705/16, 17, 18; 455/410, 455/411, 420

See application file for complete search history.

(56) References Cited

U.S. PATENT DOCUMENTS 6,101,483 A  *  8/2000  Petrovich et al. .............. 705/26
6,415,165 B1 *  7/2002  Ishigami ...................... 455/566
6,462,644 B1 * 10/2002  Howell et al. ............. 340/5.92
6,539,282 B1 *  3/2003  Metcalf et al. ............. 700/237
6,584,309 B1 *  6/2003  Whigham ................. 455/414.1
6,612,488 B1 *  9/2003  Suzuki ....................... 235/380
6,684,200 B1 *  1/2004  Koga ........................... 705/18
6,725,460 B1 *  4/2004  Nishiyama et al. ........... 725/32
6,757,585 B1 *  6/2004  Ohtsuki et al. ............. 700/237
6,810,234 B1 * 10/2004  Rasanen et al. ........... 455/41.2

FOREIGN PATENT DOCUMENTS

WO      WO 99/22346      *  5/1999

* cited by examiner

*Primary Examiner*—Khoi H. Tran
(74) *Attorney, Agent, or Firm*—Frommer Lawrence & Haug LLP; William S. Frommer; Thomas F. Presson

(57) ABSTRACT

A certification apparatus stores personal information certified to a user to register the user. When a user presented password sent from a portable telephone coincides with a password stored as a part of the personal information and the user who is operating the portable telephone is specified to be the same person as the registered user, adult certification data certifying the user being an adult on the basis of the personal information is sent to the portable telephone. Consequently, it becomes possible to make a portable terminal acquire certification information certifying personal information, and to prevent unfair use of the certification information by a third party almost surely. Thereby, a certification system capable of preventing unfair use by the third party almost surely can be achieved.

9 Claims, 9 Drawing Sheets

F I G. 1
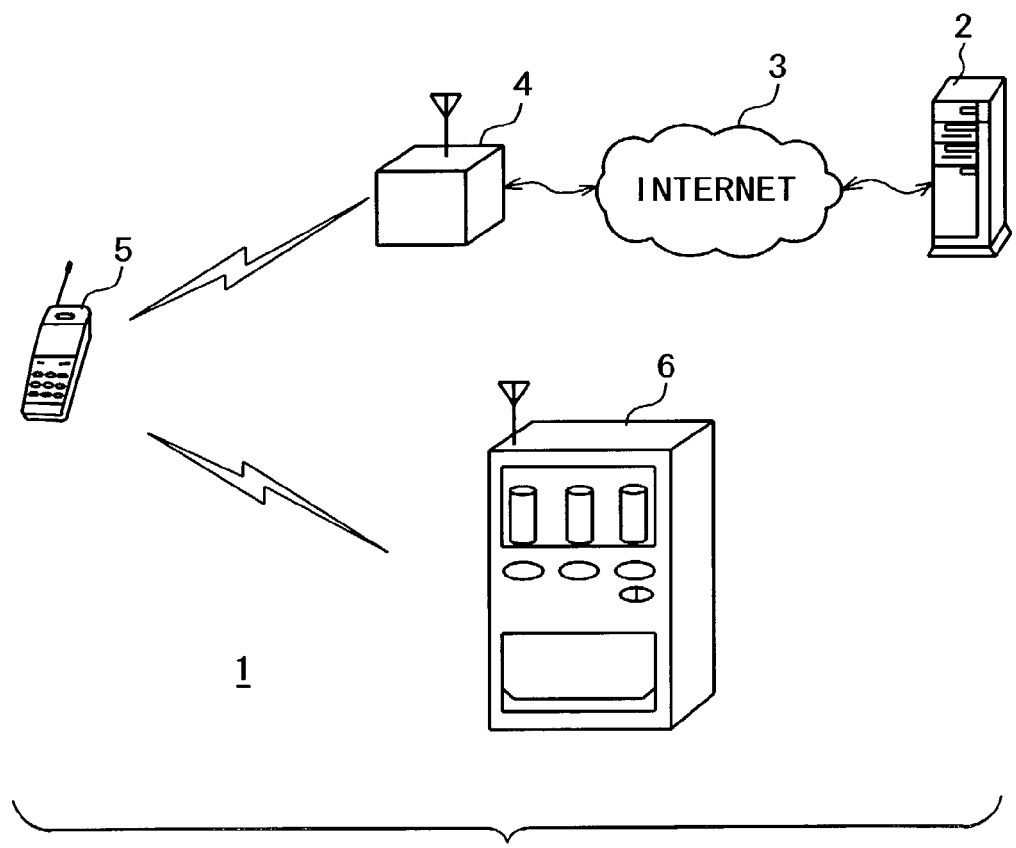

F I G. 3

| USER ID | NAME | DATE OF BIRTH | PASSWORD |
|---------|------|---------------|----------|
| △△△△ | TARO HATUMEI | 19641205 | abc |
| ○○○○ | HANAKO TOKKYO | 19700122 | opq |
| □□□□ | ICHIRO SONI | 19850820 | xyz |
| .... | .... | .... | .... |

10  11  12  13

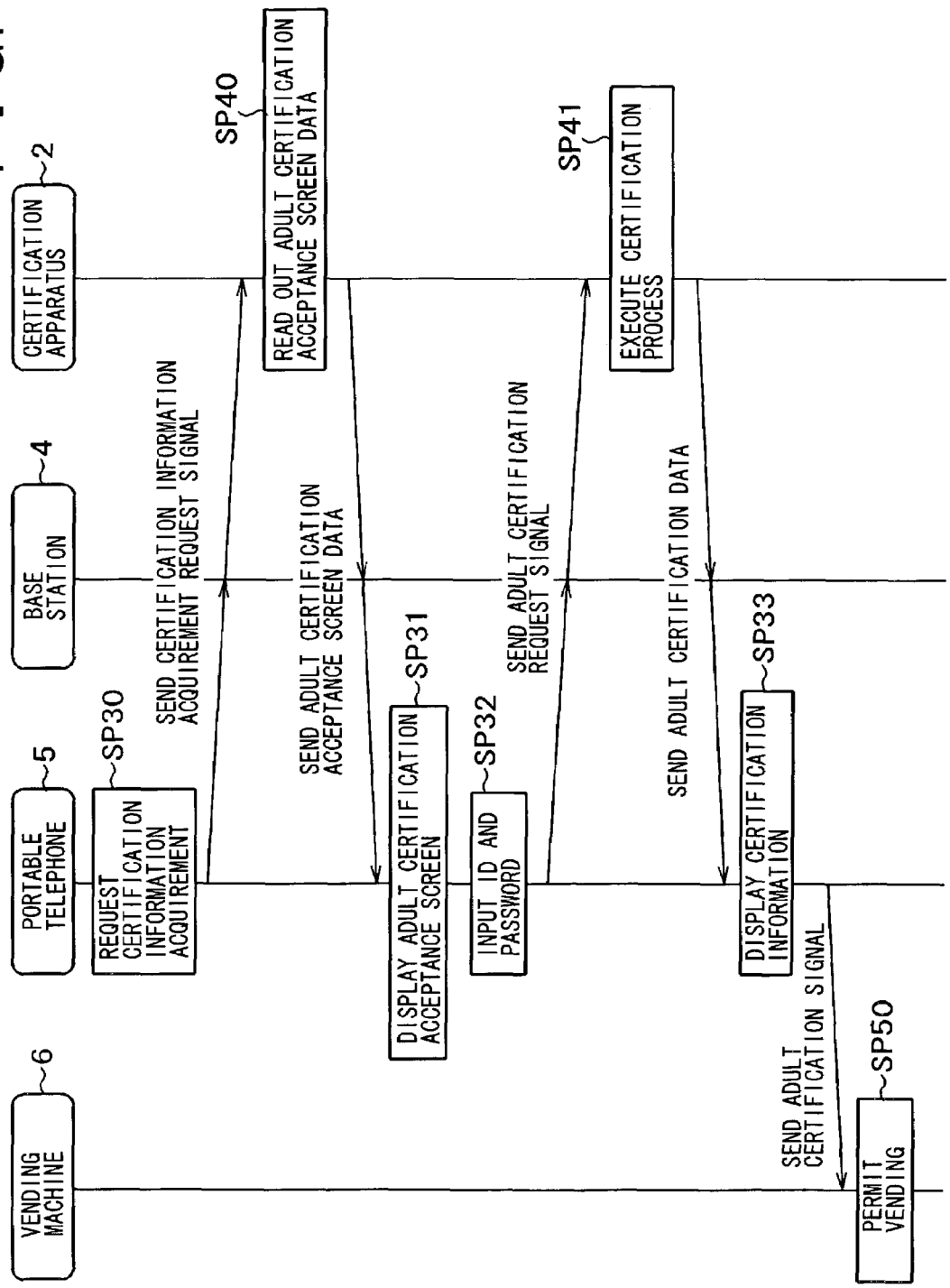

CERTIFICATION SYSTEM, CERTIFICATION APPARATUS, AND CERTIFICATION METHOD

CROSS REFERENCE TO RELATED APPLICATIONS

This application claims priority from Japanese Priority Document No. P2002-006770, filed on Jan. 15, 2002 with the Japanese Patent Office, which document is hereby incorporated by reference.

BACKGROUND OF THE INVENTION

1. Field of the Invention

The present invention relates to a certification system, a certification apparatus, a certification method, a certification program, a certification program storage medium, a portable terminal apparatus, a certification information acquirement method, a certification information acquirement program, a certification information acquirement program storage medium, a commodity vending apparatus, a commodity vending method, a commodity vending program and a commodity vending program storage medium. The present invention is suitable for being applied to, for example, a certification system capable of being used for purchasing a commodity.

2. Description of Related Art

Conventionally, as a certification system of this kind, it is known a certification read apparatus provided in a vending machine dealing in a commodity which is not permitted to be vended to underage user (hereinafter referred to as an underage vending prohibited commodity). When, for example, a driving license for a car of a user is inserted into such certification read apparatus for the certification, the apparatus judges whether the user is an adult or not on the basis of the inserted driving license to permit the user to purchase the underage vending prohibited commodity.

Incidentally, in the certification system of this type, there is the possibility of unfair use of the certification system by a third party using the driving license of an adult user obtained by a theft or a loss.

SUMMARY OF THE INVENTION

The present invention was made in view of the above description, and provides a certification system, a certification apparatus, a certification method, a certification program, a certification program storage medium, a portable terminal apparatus, a certification information acquirement method, a certification information acquirement program, a certification information acquirement program storage medium, a commodity vending apparatus, a commodity vending method, a commodity vending program and a commodity vending program storage medium, all of which can prevent such unfair use by a third party almost surely.

For solving such a problem, according to the present invention, in a certification system composed of a certification apparatus and a portable terminal apparatus, the certification apparatus comprises: registration means for registering personal information certified to a user; storage means for storing personal identification information inherent to the user; request reception means for receiving presented personal identification information sent from the portable terminal apparatus and a personal information certification request requesting certification of the personal information of the user; judgment means for judging whether the personal identification information coincides with the presented personal identification information or not; and information sending means for sending certification information certifying the personal information of the user in response to the personal information certification request to the portable terminal apparatus when the personal identification information coincides with the presented personal identification information as a result of a judgment of the judgment means; and the portable terminal apparatus comprises: input means for entering the presented personal identification information; request sending means for sending the presented personal identification information and the personal information certification request to the certification apparatus; and information reception means for receiving the certification information sent from the certification apparatus as a result of sending the presented personal identification information and the personal information certification request to the certification apparatus.

Consequently, it is possible to suitably judge whether a user using a portable terminal apparatus is the user who has registered certified personal information or not by comparing personal identification information with presented personal identification information, and to make the portable terminal apparatus used by the user acquire certification information certifying the personal information in response to the request of the user only when the user using the portable terminal apparatus is specified to be the user who has registered the certified personal information. As a result, unfair use of the certification information by a third party can almost surely be prevented.

BRIEF DESCRIPTION OF THE DRAWINGS

FIG. 1 is a schematic diagram showing an embodiment of the whole configuration of a certification system according to the present invention;

FIG. 3 is a schematic diagram of the configuration of a data table stored in a user information storage section;

FIG. 11 is a sequence chart showing the adult certification process procedure of the certification system.

DESCRIPTION OF THE PREFERRED EMBODIMENTS

Figure 2:
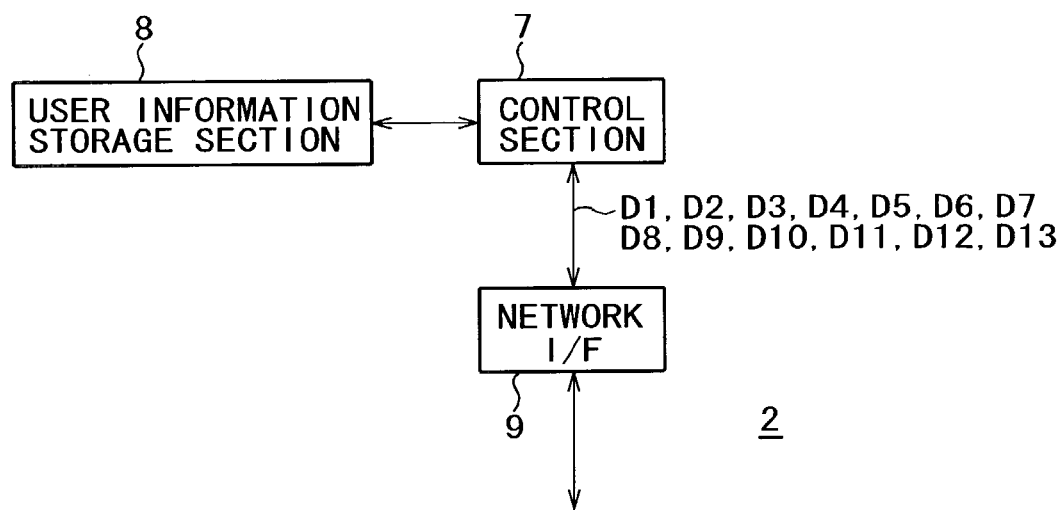
FIG. 2 is a block diagram showing the circuit configuration of an adult certification apparatus 2.

In the following, a preferred embodiment of the present invention will be described in detail with reference to the attached drawings.

In FIG. 1, a reference numeral 1 designates a certification system of the present invention as a whole. In the adult certification system 1, a base station 4 being a fixed wireless station of a wireless communication system is connected to a certification apparatus 2 composed of a personal computer through the Internet 3, and a portable telephone 5 as a mobile wireless station of the wireless communication system is connected to the base station 4 by wireless.

Moreover, the portable telephone 5 is made to be capable of being wirelessly connected to a vending machine 6 dealing in a commodity which is not permitted to be vended to an underage user (hereinafter referred to as an underage prohibited commodity) with a short-distance wireless communication in conformity with Bluetooth.

Incidentally, the Bluetooth is a short-distance wireless data communication standard standardized by a Bluetooth special interest group (SIG) being a standardization group. The Bluetooth regulates the communication standard as follows. Seventy-nine channels having a bandwidth of 1 MHz severally are set in an industrial scientific and medical (ISM) band of 2.4 GHz, and a data transfer of 10 m is performed at a data transfer rate of 1 Mbit/sec. (721 kbit/sec. in an effective value) by means of a spread spectrum communication method of a frequency hopping system in which channels are switched 1600 times for one second.

In this case, when registration application information composed of a user name, the date of birth of the user, personal identification information inherent to the user (hereinafter referred to as a password), and the like is sent from the portable telephone 5 through the base station 4 and the Internet 3 in order, the certification apparatus 2 receives the registration application information.

Then, the certification apparatus 2 inquires a user database apparatus (not shown) existing in the Internet, for example, of a portable telephone company contracted with the user whether the contents of the registration application information (namely, the personal information of the user owning the portable telephone 5 such as the name and the date of birth of the user) is correct or not.

Thereby, when the personal information of the user who requests the registration is proved to be correct, the certification apparatus 2 allocates a user identification (ID) inherent to the user, and adds thus allocated user ID to the registration application information. Then, the certification apparatus 2 stores the registration application information and the added user ID collectively as the user information to register them.

Incidentally, the certification apparatus 2 informs the portable telephone 5 of the user, who requests the registration, the completion of the registration together with the user ID through the Internet 3 and the base station 4 in order.

In this state, when a user ID and a password presented, or entered, by a user (hereinafter referred to as a user presented password) are sent as an adult certification request from the portable telephone 5 through the base station 4 and the Internet 3 in order, the certification apparatus 2 receives them.

In this case, the certification apparatus 2 selects the user information of the user which has been registered previously on the basis of the user ID included in the received adult certification request, and further judges whether the password included in the selected user information coincides with the user presented password included in the adult certification request or not.

As a result, when the password and the user presented password coincide with each other, the certification apparatus 2 judges that the user who is operating the portable telephone 5 and the user registered in the certification apparatus 2 are the same person, and the certification apparatus 2 successively judges whether the user who is operating the portable telephone 5 is an adult or not on the basis of the date of birth included in the user information.

Thereby, when the certification apparatus 2 judges that the user who is operating the portable telephone 5 is an adult, the certification apparatus 2 sends adult certification information certificating that the user is an adult to the portable telephone 5 through the Internet 3 and the base station 4 in order.

Incidentally, when the password does not coincide with the user presented password, or when the user who is operating the portable telephone 5 is not an adult (namely is an underage user), the certification apparatus 2 sends error information indicating that the certification apparatus 2 cannot comply with the adult certification request to the portable telephone 5 through the Internet 3 and the base station 4.

In such a way, the certification apparatus 2 enables a user to acquire the adult certification information only when the user registered on the previous certification of the correctness of the user's personal information coincides with the user of the portable telephone 5 and when the user is an adult.

Then, when the portable telephone 5 sends the adult certification information acquired from the certification apparatus 2 to the vending machine 6, the vending machine 6 judges that the user requesting the purchase of an underage prohibited commodity (namely, the user who is operating the portable telephone 5) is an adult on the basis of the adult certification information, and the vending machine 6 is made to permit the user to purchase the underage prohibited commodity in such a case.

Incidentally, when the vending machine 6 receives error information sent from the portable telephone 5, the vending machine 6 is made not to permit the user to purchase the underage prohibited commodity in such a case.

Thereby, the adult certification system 1 can previously prevent a third party who acquired the portable telephone 5 illegally or an underage user from purchasing an underage prohibited commodity from the vending machine 6 unfairly.

Now, as shown in FIG. 2, the certification apparatus 2 is composed of a control section (hereinafter referred to as a certification apparatus control section) 7 connected to a user information storage section 8 and a network interface (I/F) 9.

In this case, the certification apparatus control section 7 is composed of a central processing unit (CPU), a read only memory (ROM), a random access memory (RAM), a real time clock (RTC) circuit and the like although they are not shown in this figure. The certification apparatus control section 7 is configured for enabling the realization of various functions of the certification apparatus 2 collectively in conformity with the various application programs such as an adult certification program and the like by expanding a basic program stored in the ROM in advance and the various application programs.

Moreover, the user information storage section 8 is composed of, for example, a hard disk drive, and user registration screen data D1 and adult certification acceptance screen data D2 are previously stored in the hard disk drive of the user information storage section 8.

In addition to it, as shown in FIG. 3, a user data table is stored in the user information storage section 8. The user data table is produced by associating user information with each user and by listing many pieces of user information for many user. Further the user information is composed of a user ID 10, a user name 11, a date of birth 12 of the user, a password 13, a telephone number (not shown) and an e-mail address (not shown) of the portable telephone 5, and the like.

Then, when the certification apparatus 2 receives registration request data D4 of a user sent from the portable telephone 5 through the network interface 9, the certification apparatus 2 reads out the user registration screen data D1 from the user information storage section 8, and sends the read user registration screen data D1 to the portable telephone 5 through the network interface 9.

As a result, the registration application information composed of the user name, the date of birth of the user, the password, the user e-mail address, the user telephone number, and the like that have been entered on a user registration screen based on the user registration screen data D1 is sent as registration application data D3 from the portable telephone 5 to the control section 7. When the certification apparatus control section 7 receives the registration application data D3 through the network interface 9, the certification apparatus control section 7 generates user information certification data D4 on the basis of the registration application data D3 for inquiring whether the user personal information is correct or not, and sends the generated user information certification data D4 to the user database apparatus (not shown) of a portable telephone company in the Internet.

Then, when the certification apparatus control section 7 receives contracted user confirmation data D5 certifying that the user personal information is correct (namely, is not one made illegally or made by fabrication) from the user database apparatus, the certification apparatus control section 7 continues the user registration process.

That is, the certification apparatus control section 7 allocates the user ID inherent to a user requesting his or her registration, and adds the registration to the registration application information based on the registration application data D3 to store the added registration application information as the user information in the user information storage section 8. Then the certification apparatus control section 7 sends registration completion data D6 including the user ID to the portable telephone 5.

Thereby, the certification apparatus control section 7 can register only the user whose personal information presented for registration has been certified to be correct.

Moreover, when certification information acquisition request data D7 requesting adult certification information is sent from the portable telephone 5, the certification apparatus control section 7 receives the certification information acquisition request data D7 through the network interface 9, and reads out adult certification acceptance screen data D2 from the user information storage section 8 correspondingly to the received certification information acquisition request data D7. In addition, the certification apparatus control section 7 sends the read adult certification acceptance screen data D2 to the portable telephone 5 as an acquisition request source through the network interface 9.

As a result, when the user ID and the user presented password entered on the adult certification acceptance screen data D2 from the portable telephone 5 as the acquisition request source has been sent as adult certification request data D8, the certification apparatus control section 7 receives the sent adult certification request data D8 through the network interface 9.

Then, the certification apparatus control section 7 retrieves each user information in the user data base in the user information storage section 8 on the basis of the user ID acquired on the basis of the adult certification request data D8 to read out the password. In addition, the certification apparatus control section 7 judges whether the read password coincides with the user presented password made on the basis of the adult certification request data D8 or not.

As a result, when the password corresponds with the user presented password, the certification apparatus control section 7 detects the age of the user on the basis of the user data of birth corresponding to the user ID in the user data table and date information indicating the present date being timed by a real time clock (RTC) circuit in the certification apparatus control section 7, and judges whether the detected age is included one of an adult or not.

Incidentally, when the certification apparatus control section 7 judges that the user who is operating the portable telephone 5 is an adult, the certification apparatus control section 7 generates adult certification data D9 certificating that the user is an adult, and sends the generated adult certification data D9 to the portable telephone 5 as the acquisition request source through the network interface 9.

Moreover, when the certification apparatus control section 7 judges that the user who is operating the portable telephone 8 is not an adult, the certification apparatus control section 7 generates error data D10 indicating the impossibility of complying with the acquisition request of the adult certification information, and sends the generated error data D10 to the portable telephone 5 as the acquisition request source through the network interface 9.

Incidentally, when there is no user information corresponding to the user ID acquired on the basis of the adult certification request data D8 in the user information storage section 8, or when the user presented password does not coincide with the password in the user information, the certification apparatus control section 7 generates the above-mentioned error data D10, and sends the generated error data D10 to the portable telephone 5 as the acquisition request source through the network interface 9.

Now, when discount point data D11 or present point data D12, both of which are to be acquired from the vending machine 6 by the portable telephone 5 in the case where a user being an adult has purchased an underage prohibited commodity, are sent from the portable telephone 5, the certification apparatus 2 receives them through the network interface 9, and stores them into user information storage section 8 correspondingly to the user ID to accumulate them there.

Then, if the amount of the discount point data D11 accumulated in the user information storage section 8 is equal to a fixed quantity or more, the certification apparatus 2 adds discount information data D13 to the adult certification data D9 at the time of requesting adult certification information, and sends the adult certification data D9 including the discount information data D13 to the portable telephone 5 as the acquisition request source through the network interface 9.

Thereby, the certification apparatus 2 gives a user who frequently uses the vending machine 6 the discount information to enable him or her to purchase a commodity at a discounted price.

Moreover, the certification apparatus 2 is made so that, when the amount of the present point data D12 accumulated in the user information storage section 8 is equal to a fixed value or more, the certification apparatus 2 automatically applies a selling company of an underage prohibited commodity for a present in place of the user of the portable telephone 5, which makes it possible to save the user from trouble of applying by a postal card on which collected commodity seals or the like are pasted.

As described above, the adult certification system 1 prepares the discount point information and the present point information corresponding to the user ID, and stores them into the user information storage section 8 to accumulate them therein. Consequently, the adult certification system 1 can easily cope with the case of granting an additional privilege such as the vending at a discounted price or an automatic application to a present.

Figure 4:
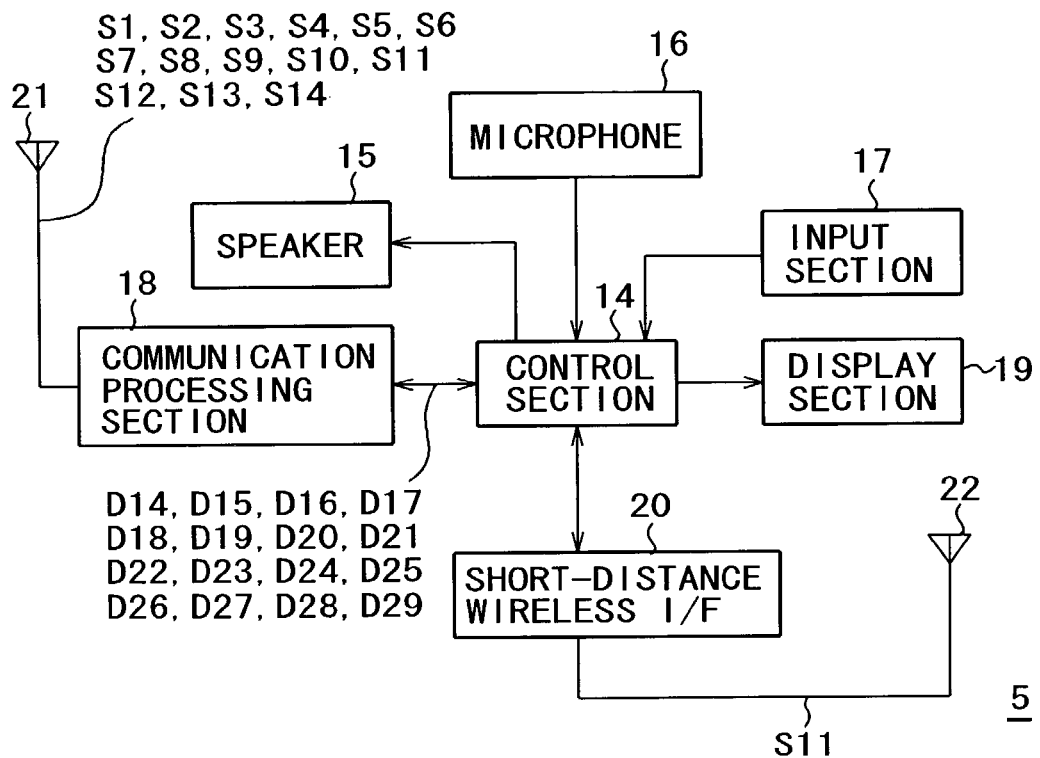
FIG. 4 is a block diagram showing the circuit configuration of a portable telephone 5.

As shown in FIG. 4, in the portable telephone 5, a speaker 15, a microphone 16, an input section 17, a communication processing section 18, a display section 19, and a short-distance wireless interface 20 are connected to a control section (hereinafter referred to as a telephone control section) 14 controlling various functions of the portable telephone 5 collectively.

The telephone control section 14 is made of a microcomputer composed of a CPU, a ROM, a RAM and the like although they are not shown in this figure. In the RAM, the telephone control section 14 expands various programs stored in the ROM in advance and various application program such as adult certification information acquirement program and the like. Then, the telephone control section 14 is configured for enabling collective control of various functions of the portable telephone 5 in conformity with these various programs to realize the functions.

When a calling designation instruction composed of the telephone number of a calling party, a calling request and the like is given according to an operation of the input section 17 composed of an operation key and the like in a speaking mode, the telephone control section 14 ensures the speaking state of the telephone (not shown) of the calling party on the basis of the calling designation instruction through the base station 4.

Then, the telephone control section 14 sends voice data D14 composed of the voice of a user, which has been collected with the microphone 16, to the communication processing section 18. Thereby, the communication processing section 18 performs a prescribed sending process of the voice data D14, and sends an acquired voice signal S1 to the base station 4 through an antenna element 21. In addition, the telephone control section 14 receives a voice signal S2 sent from the telephone (not shown) of the calling party through the base station 4 with the antenna element 21 to take the voice signal S2 into the communication processing section 18. Then, the communication processing section 18 performs a prescribed reception process of the voice signal S2, and sends acquired voice data D15 to the speaker 15. Thereby, the voice of the calling party based on the voice data D15 is output from the speaker 15.

Consequently, the telephone control section 14 establishes a call between the user and the calling party.

Here, if the user of the portable telephone 5 requests registration to the certification apparatus 2, the telephone control section 14 generates registration request data D16 indicating a request instruction of registration to be entered through the input section 17, and sends the generated registration request data D16 to the communication processing section 18.

The communication processing section 18 performs the prescribed sending process of the registration request data D16 supplied from the telephone control section 14, and sends an acquired registration request signal S3 to the certification apparatus 2 from the antenna element 21 through the base station 4 and the Internet 3 in order.

As a result, the communication processing section 18 takes in a user registration screen signal S4, send from the certification apparatus 2 through the Internet 3 and the base station 4 in order, with the antenna element 21, and performs the prescribed reception process of the taken user registration screen signal S4 to generate user registration screen data D17. Then, the communication processing section 18 sends the generated user registration screen data D17 to the telephone control section 14.

The telephone control section 14 sends the user registration screen data D17 supplied from the communication processing section 18 to the display section 19, and makes the display section 19 display a user registration screen (not shown) based on the user registration screen data D17.

In the state, when registration application information is entered on the user registration screen according to an operation of the input section 17 and a sending instruction of the registration application information is entered through the input section 17, the telephone control section 14 generates registration application data D18 on the basis of the registration application information, and sends the generated registration application data D18 to the communication processing section 18.

The communication processing section 18 performs the prescribed sending process of the registration application data D18 supplied from the telephone control section 14, and sends an acquired registration application signal S5 to the certification apparatus 2 from the antenna element 21 through the base station 4 and the Internet 3 in order.

As a result, the telephone control section 14 takes a registration completion signal S6 sent from the certification apparatus 2 into the communication processing section 18 through the antenna element 21.

The communication processing section 18 performs the prescribed reception process of the registration completion signal S6, and sends acquired registration completion screen data D19 to the telephone control section 14.

The telephone control section 14 sends the registration completion screen data D19 supplied from the communication processing section 18 to the display section 19, and makes the display section 19 display a user information registration completion screen (not shown) based on the registration completion screen data D19.

Thereby, the telephone control section 14 makes a user who is operating the portable telephone 5 confirm a user ID assigned to the user and a password determined by the user arbitrarily on the user information registration completion screen, and informs the completion of the registration of user information.

In such a way, the adult adult certification system 1 makes the portable telephone 5 display the user registration screen, and thereby automatically confirms that the user is the user himself through a portable telephone company with which the user is previously contracted only by registering the user information. Consequently, the user can easily be registered by the certification apparatus 2.

Moreover, even if a user does not own a certification of a driving license for a car, the adult certification system 1 can register any person who has contracted with a portable telephone company to own the portable telephone 5 into the certification apparatus 2. Consequently, the user can use the portable telephone 5 in place of the certification document.

Now, when an acquisition instruction of certification information is entered into the telephone control section 14 by an operation of the input section 17, the telephone control section 14 generates certification information acquisition request data D20 on the basis of the acquisition instruction, and sends the generated certification information acquisition request data D20 to the communication processing section 18.

The communication processing section 18 performs the prescribed sending process of the certification information acquisition request data D20 supplied from the telephone control section 14, and sends obtained certification information acquisition request signal S7 from the antenna element 21 to the certification apparatus 2 thorough the base station 3 and the Internet 4.

As a result, the communication processing section 18 takes in an adult certification acceptance screen signal S8 sent through the certification apparatus 2, the Internet 3 and the base station 4 with the antenna element 21.

Here, the communication processing section 18 performs the prescribed reception process of the adult certification acceptance screen signal S8, and sends obtained adult certification acceptance screen data D21 to the telephone control section 14

Figure 5:
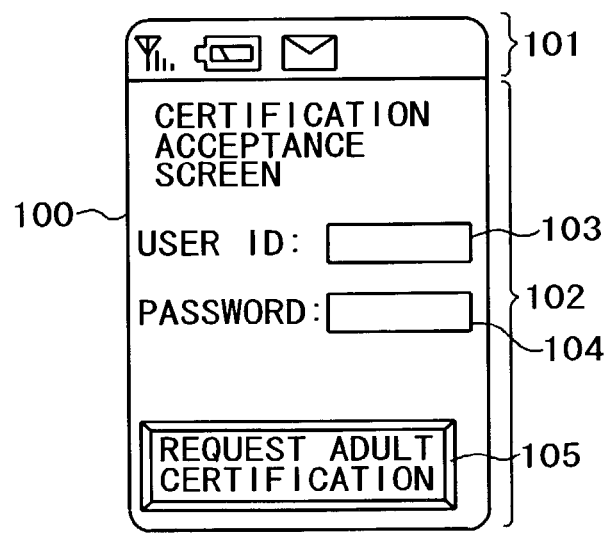
FIG. 5 is a schematic diagram showing an adult certification acceptance screen of the portable telephone 5.

The telephone control section 14 sends the adult certification acceptance screen data D21 supplied from the communication processing section 18 to the display section 19, and makes the display section 19 display an adult certification acceptance screen 100 based on the adult certification acceptance screen data D21 as shown in FIG. 5.

The adult certification acceptance screen 100 is composed of a state display region 101 and an adult certification request input region 102 in the order from the top of the screen to the bottom of the screen.

In the state display region 101 of the adult certification acceptance screen 100, a plurality of icons indicating various pieces of information indicating states of the portable telephone 5 such as the reception state of a radio wave, the existence of the receipt of electronic mail, the residual quantity of a battery, and the like is displayed.

Moreover, in the adult certification acceptance screen 100, a user ID input region 103 for entering a user ID by the use of figures, the alphabet and the like is formed at the central part of the adult certification request input region 102, a user password input region 104 for entering a password by the use of figures, the alphabet and the like is formed below the user ID input region 103, and is further formed an adult certification start icon 105 for sending the user ID and the user password as an adult certification request to the certification apparatus 2 below the user password input region 104.

In this case, when a user ID and a user password are entered through the user ID input region 103 and the user password input region 104, respectively, on the adult certification acceptance screen 100, and when an selection determination instruction of the adult certification start icon 105 is entered into the telephone control section 14 according to the operations of the input section 17, the telephone control section 14 generates adult certification request data D22, and sends the generated adult certification request data D22 to the communication processing section 18.

The communication processing section 18 performs the prescribed sending process of the adult certification request data D22 supplied from the telephone control section 14, and sends an acquired adult certification request signal S9 from the antenna element 21 to the base station 4.

As a result, the certification apparatus 2 can specify that the user who is operating the portable telephone 5 is a user registered in advance. And successively, when it is certified that the user is an adult, the communication processing section 18 takes in an adult certification signal S10 sent from the certification apparatus 2 to the portable telephone 5 through the Internet 3 and the base station 4 with the antenna element 21.

Then, the communication processing section 18 performed the prescribed reception process of the adult certification signal S10, and generates adult certification data D23 to send the adult certification data D23 to the telephone control section 14.

Figure 6:
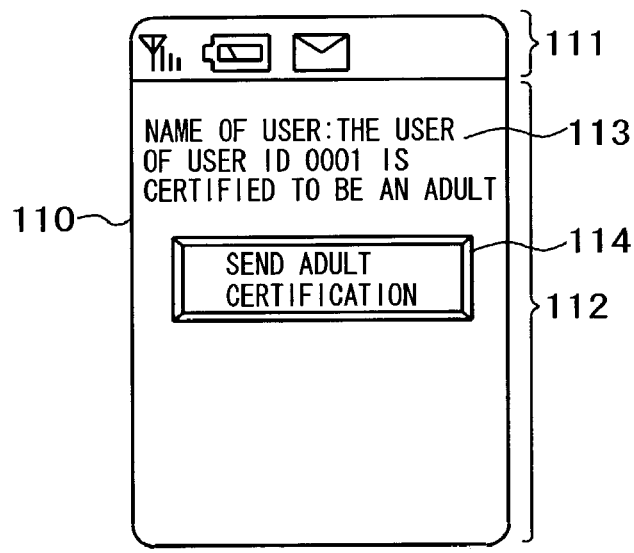
FIG. 6 is a schematic diagram showing an adult certification screen of the portable telephone 5.

Moreover, the telephone control section 14 generates adult certification display screen data D24 on the basis of the adult certification data D23 supplied from the communication processing section 18, and sends the generated adult certification display screen data D24 to the display section 19. Then, the telephone control section 14 makes the display section 19 display an adult certification screen 110 based on the adult certification display screen data D24 as shown in FIG. 6.

Here, the adult certification screen 110 is configured to display a state display region 111 and an adult certification information display region 112 in order from the top of the screen to the bottom of the screen.

In this case, various icons indicating the states of the portable telephone 5 are displayed in the state display region 111 of the adult certification screen 110 similarly to the adult certification acceptance screen 100 (as shown in FIG. 5).

Moreover, in the adult certification screen 110, there are displayed adult certification information 113 as the information certifying that the user is an adult at the central part of the adult certification information display region 112 and an adult certification sending icon 114 for sending the adult certification data D23 to the vending machine 6 below the adult certification information 113.

In this state, when an selection determination instruction of the adult certification sending icon 114 is entered on the adult certification screen 110 according to an operation of the input section 17, the telephone control section 14 sends the adult certification data D23 to a short-distance wireless interface (hereinafter referred to as a telephone short-distance wireless interface) 20 in FIG. 4. Then the telephone control section 14 performs a prescribed sending process of the adult certification data D23, and sends an acquired adult certification signal S11 to the vending machine 6 located in the vicinity of the portable telephone 5 through a short-distance wireless antenna 22 for a telephone.

Incidentally, the portable telephone 5 does not store any user ID and any user offered password in the inside thereof, and also erases adult certification information at the time of the end of the purchase of an underage prohibited commodity or at the time of switching a display of its display section.

Thereby, the user ID, the user presented password and the adult certification information of the portable telephone 5 can surely be prevented from being illegally or unfairly used even if the portable telephone 5 itself is passed into a third party's hand.

Incidentally, if discount information data D25 is added to the adult certification data D23, the portable telephone 5 is made to transmit the discount information data D25 added to the adult certification data D23 also to the vending machine 6 as it is.

In such a way, the adult certification system 1 can provide a commodity at a discounted price according to the frequency of using the vending machine 6 by the user of the portable telephone 5.

Moreover, the telephone control section 14 sends discount point data D26 and present point data D27, which are sent from the vending machine 6 after purchasing a commodity, to the communication processing section 18, and the communication processing section 18 performs the prescribed sending process of the sent discount point data D26 and the present point data D27. Then, the communication processing section 18 sends an acquired discount point signal S12 and a present point signal S13 from the antenna element 21 to the certification apparatus 2.

Moreover, the portable telephone 5 takes an error signal S14 indicating the impossibility of complying with an acquisition request of the adult certification information from the certification apparatus 2 into the communication processing section 18 through the antenna element 21. Then, the communication processing section 18 performs the prescribed reception process of the error signal S14, and generates error information screen data D29 on the basis of acquired error data D28. And, the communication processing section 18 sends the generated error information screen data D29 to the display section 19 to make the display section 19 display an error information screen (not shown).

Figure 7:
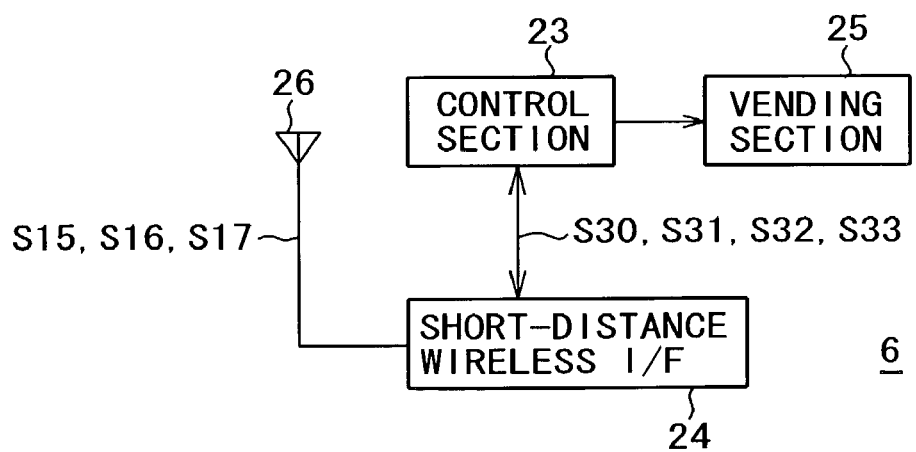
FIG. 7 is a block diagram showing the circuit configuration of a vending machine.

Successively, in the vending machine 6, as shown in FIG. 7, a short-distance wireless interface (hereinafter referred to as a vending machine short-distance wireless interface) 24 and a vending section 25 are connected to a control section (hereinafter referred to a vending machine control section) 23.

Now, when the vending machine control section 23 receives an adult certification signal S15 sent from the portable telephone 5 with an antenna (hereinafter referred to as a vending machine short-distance wireless antenna) 26, the vending machine control section 23 takes the adult certification signal S15 into the vending machine short-distance wireless interface 24. Then, the vending machine short-distance wireless interface 24 performs a prescribed reception process of the adult certification signal S15, and takes acquired adult certification data D30 therein. After that, the vending section 25 begins to vend an underage prohibited commodity according to the adult certification data D30.

Incidentally, if discount information data D31 is added to the adult certification data D30, the vending machine control section 23 sends the discount information data D31 to the vending section 25 together with the adult certification data D30, and the vending of the underage prohibited commodity is begun at a discounted price based on the discount information data D31.

Incidentally, when an underage prohibited commodity is purchased by an adult user, the vending machine control section 23 generates discount point data D32 and present point data D33. Then, the vending machine short-distance wireless interface 24 performs a prescribed sending process to send an acquired discount point signal S16 and a present point signal S17 to the portable telephone 5.

Figure 8:
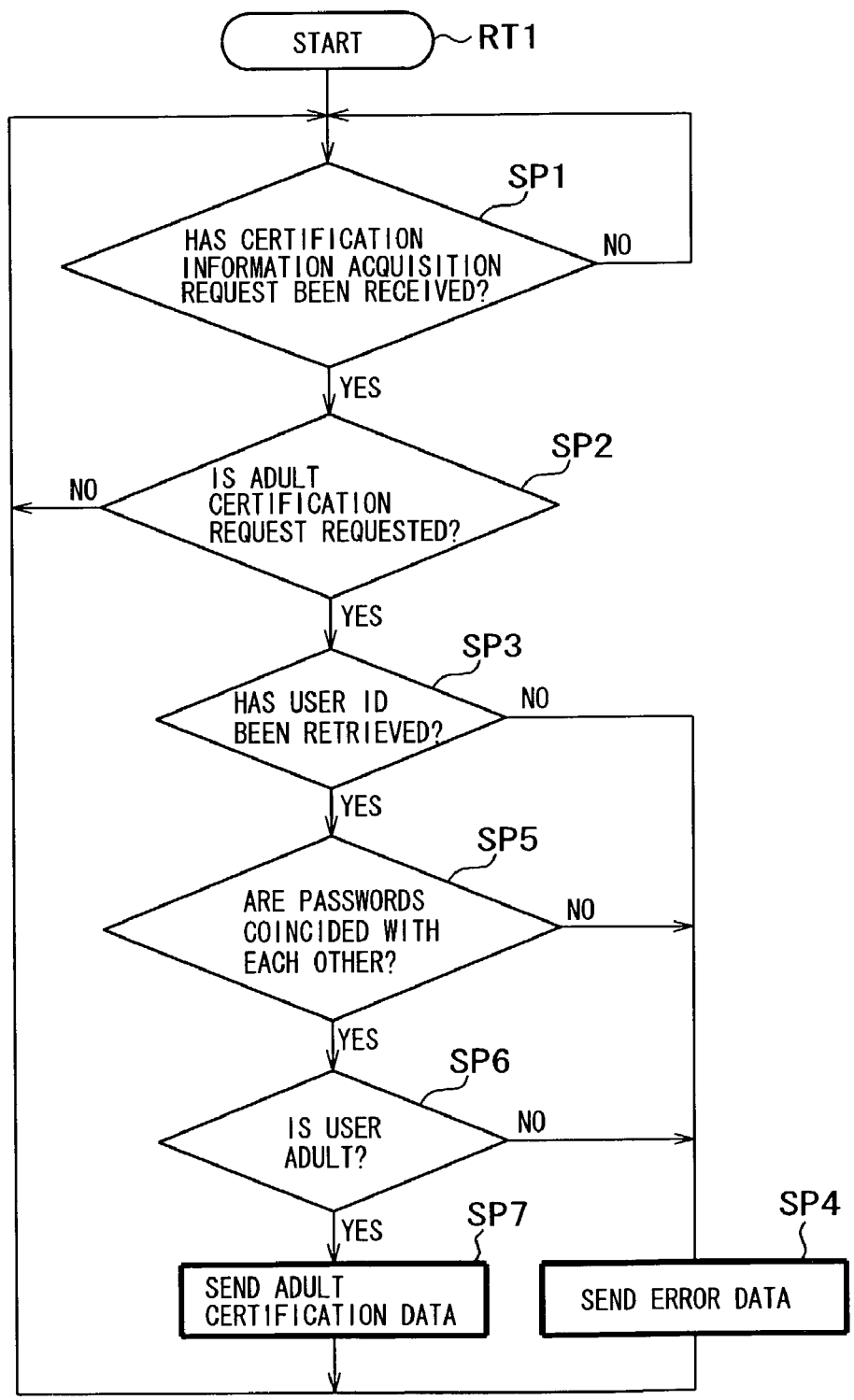
FIG. 8 is a flow chart showing an adult certification process procedure of a certification apparatus.

Here, the certification apparatus control section 7 of the certification apparatus 2 practically performs an adult certification process in accordance with an adult certification process procedure RT1 shown in FIG. 8 at the time of an acquisition request from the portable telephone 8. That is, the process enters the adult certification process procedure RT1 at a start step, and proceeds to a step SP1. At the step SP1, the certification apparatus control section 7 waits the certification information acquisition request data D7 to be sent from the portable telephone 5. When the certification apparatus control section 7 receives the certification information acquisition request data D7, the certification apparatus control section 7 reads the adult certification acceptance screen data D2, and sends the read adult certification acceptance screen data D2 to the portable telephone 5 as the acquisition request source. Then, the process proceeds to the next step SP2.

At the step SP2, the certification apparatus control section 7 judges whether the adult certification request data D8 sent from the portable telephone 5 has been received or not.

If a negative result is acquired at the step SP2, the result indicates that the adult certification request data D8 has not been received. Then, the process of the certification apparatus control section 7 returns to the step SP1.

On the contrary, if a positive result is acquired at, the step SP2, the result indicates that the adult certification request data D8 has been received. In this case, the process of the certification apparatus control section 7 proceeds to a step SP3.

At the step SP3, the certification apparatus control section 7 judges whether the user information in the user data base corresponding to the user ID of the adult certification request data D8 has been retrieved or not.

If a negative result is acquired at the step SP3, the result indicates that the user information corresponding to the user ID of the adult certification request data D8 has not been retrieved. In this case, the process of the certification apparatus control section 7 proceeds to a step SP4.

On the contrary, if a positive result is acquired at the step SP3, the result indicates that the user information corresponding to the user ID of the adult certification request data D8 has been retrieved. In this case, the process of the certification apparatus control section 7 proceeds to a step SP5.

At the step SP5, the certification apparatus control section 7 judges whether a password in the retrieved user information coincides with the user presented password in the adult certification request data D8 or not.

If a negative result is acquired at the step SP5, the result indicates that the password in the retrieved user information did not coincide with the user presented password in the adult certification request data D8. In this case, the process of the certification apparatus control section 7 proceeds to the step SP4.

On the contrary, if a positive result is acquired at the step SP5, the result indicates that the password in the retrieved user information coincided with the user presented password in the adult certification request data D8. In this case, the process of the certification apparatus control section 7 proceeds to a step SP6.

At the step SP6, the certification apparatus control section 7 examines the elapsed years of the date information given on the basis of the date of birth in the retrieved user information and the basis of the date information which is timed by the RTC circuit, and thereby judges whether the user is an adult or not.

If a negative result is acquired at the step SP6, the result indicates that the user registered in the user information storage section 8 is an underage user. In this case, the process of the certification apparatus control section 7 proceeds to the step SP4.

At the step SP4, the certification apparatus control section 7 sends the error data D10 to the portable telephone 5, and returns to the step SP1 to repeat the above-mentioned process.

On the contrary, if a positive result is acquired at the step SP6, the result indicates that the user registered in the user information storage section 8 is an adult. In this case, the certification apparatus control section 7 proceeds to a step SP7.

At the step SP7, the certification apparatus control section 7 sends the adult certification data D9 to the portable telephone 5, and then proceeds to the step SP1 to repeat the above-mentioned process.

Next, the telephone control section 14 of the portable telephone 5 performs an adult certification information acquisition process procedure RT2 shown in FIG. 9 as follows. That is, the process of the adult certification information acquisition process procedure RT2 enters at a start step, and proceeds to a step SP10. At the step SP10, when a certification information acquisition request instruction is entered into the telephone control section 14 through the input section 17, the telephone control section 14 sends the certification information acquisition request signal S7 based on the acquisition request to the certification apparatus 2, and the process of the telephone control section 14 proceeds to a step SP11.

At the step SP11, the telephone control section 14 takes the adult certification acceptance screen signal S8 into the communication processing section 18 through the antenna element 21. Then, the communication processing section 18 performs the prescribed reception process to acquire the adult certification acceptance screen data D21. The communication processing section 18 sends the acquired adult certification acceptance screen data D21 to the display section 19, and the telephone control section 14 makes the display section 19 display the adult certification acceptance screen 100. Then, the process of the telephone control section 14 proceeds to a step SP12.

At the step SP12, after the user ID and the user presented password have been entered to the telephone control section 14 on the adult certification acceptance screen 100 according to the operations of the input section 17 and an instruction of the selection of the adult certification request icon 105 has been entered in this state, the telephone control section 14 sends the adult certification request signal S9 to the certification apparatus 2, and the process of the telephone control section 14 proceeds to the next step SP13.

At the step SP13, the telephone control section 14 judges whether the adult certification data D23 has been received or not.

If a negative result is acquired at the step SP13, the result indicates that the portable telephone 5 is operated by an underage user or by a third party other than the true user. In this case, the process of the telephone control section 14 proceeds to a step SP14.

At the step SP14, the telephone control section 14 sends the error information screen data D29 to the display section 19, and makes the display section 19 display an error information screen. After that, the process of the telephone control section 14 proceeds to a step SP15.

On the contrary, if a positive result is acquired at the step SP13, the result indicates that the portable telephone 5 is operated by a regular user who is an adult. In this case, the process of the telephone control section 14 proceeds to a step SP16.

At the step SP16, the telephone control section 14 sends the adult certification display screen data D24 based on the received adult certification data D23 to the display section 19, and makes the display section 19 display the adult certification screen 110. After that, the process of the telephone control section 14 proceeds to the next step SP15.

At the step SP15, the telephone control section 14 ends the adult certification information acquisition process procedure RT2 in the portable telephone 5.

Successively, the vending machine control section 28 of the vending machine 6 performs an underage prohibited commodity purchase permission process procedure RT3 shown in FIG. 10 as follows. That is, the process of the underage prohibited commodity purchase permission process procedure RT3 enters from a start step, and proceeds to a step SP20. At the step SP20, the vending machine control section 28 waits the adult certification signal S15 to be sent from the portable telephone 5. When the vending machine control section 28 receives the adult certification signal S15, the process of the vending machine control section 28 proceeds to a step SP21.

At the step SP21, the vending machine control section 28 sends the adult certification data D30 based on the adult certification signal S15 to the vending section 25 to permit the purchase of the underage prohibited commodity. After that, the process of the vending machine control section 28 proceeds to the next step SP22, and then ends the underage prohibited commodity purchase permission process procedure RT3.

Now, the adult certification process procedure performed by the certification apparatus 2, the base station 4, the portable telephone 5, and the vending machine 6 of the adult certification system 1 is arranged as shown in FIG. 11. First, when a certification information acquisition request is entered into the portable telephone 5 by an operation of the input section 17 at a step SP30, the portable telephone 5 sends the certification information acquisition request signal S7 to the certification apparatus 2.

At this time, the certification apparatus 2 receives the certification information acquisition request data D7 from the portable telephone 5 through the base station 4 at a step SP40, and sends the adult certification acceptance screen data D2 to the portable telephone 5.

Moreover, when the portable telephone 5 receives the adult certification acceptance screen signal S8 from the certification apparatus 2 through the base station 4 at a step SP31, the portable telephone 5 makes the display section 19 display the adult certification acceptance screen 100 (FIG. 5), and the process of the portable telephone 5 proceeds to a step SP32.

At the step SP32, when a user enters his or her user ID, the user presented password and the adult certification request instruction by operating the input section 17 while viewing the adult certification acceptance screen 100 (FIG. 5), the portable telephone 5 sends the adult certification request signal S9 to the certification apparatus 2.

At this time, at a step SP41, the certification apparatus 2 receives the adult certification request data D22 through the base station, and performs the processes at the steps from SP3 to SP7 in the adult certification process procedure RT1.

When the portable telephone 5 receives the adult certification signal S10 at a step SP33, the portable telephone 5 sends the adult certification data D23 to the display section 19, and makes the display section 19 display the adult certification screen 110 (FIG. 6). Then, the portable telephone 5 sends the adult certification signal S11 to the vending machine 6 according to the operations of the input section 17.

At this time, at a step SP50, the vending machine 6 receives the adult certification signal S16 from the portable telephone 6, and judges that the user of the portable telephone 5 is an adult. Then, the vending machine 6 begins to vend the underage prohibited commodity.

By the configuration described above, in the adult certification system 1, the certification apparatus 2 assigns the user ID to the user whose personal information has been certified to the registration application information input from the portable telephone 5, and the certification apparatus registers the user information to register the user.

Then, when an adult certification request composed of a user ID and a user presented password has been sent from the portable telephone 5 to the certification apparatus 2, the adult certification system 1 retrieves the user information corresponding to the user ID of the adult certification request. When the user information is detected, the adult certification system 1 judges whether the password in the detected user information coincides with the user presented password or not.

As a result, when the password coincides with the user presented password, the adult certification system 1 judges whether the user is an adult or not on the basis of the date of birth in the user information and the date information supplied from the RTC circuit. As a result, if the user is an adult, the adult certification system 1 sends the adult certification data D9 to the portable telephone 5.

Consequently, the adult certification system 1 can issue adult certification information to the portable telephone 5 operated by a user registered in the certification apparatus 2.

In such a way, the adult certification system 1 certifies whether the registration application information acquired by the certification apparatus 2 from the portable telephone 5 through the user registration screen is the personal information of the user himself or herself through a portable telephone company. Consequently, the adult certification system 1 can easily register a user who has certified his or her personal information to the certification apparatus 2.

Moreover, even if a user does not own a driving license for a car, the adult certification system 1 can register any person who contracted with a portable telephone company and has the portable telephone 5 to the certification apparatus 2. Consequently, the portable telephone 5 can be used as a certification.

Moreover, the adult certification system 1 records discount point information and present point information correspondingly to a user ID in the user information storage section 8. Thereby, the adult certification system 1 can easily cope with a case of performing an additional privilege such as vending at a discounted price, automatic application to a present, and the like.

Then, in the adult certification system 1, the configuration of the vending machine 6 may only be to receive the adult certification signal S15 sent from the portable telephone 5 and to permit vending of an underage prohibited commodity. Consequently, the configuration can be simpler than a vending machine equipped with a certification apparatus which certifies being an adult for permitting vending by reading a driving license for a car.

Moreover, the adult certification system 1 judges the age of a user by comparing the date of birth of the user with date information in the RTC circuit. Consequently, even if a user is an underage user and does not have a certification such as a driving license for a car, the certification apparatus 2 can executes adult certification at the same time of the arrival of the birthday of the user of twenty years by previous registration of the user to the certification apparatus 2. Thereby, the certification apparatus 2 can certify being an adult immediately to the vending machine 6, and the user can purchase an underage prohibited commodity on a day when he or she becomes an adult.

According to the above-mentioned configuration, the adult certification system 1 makes the certification apparatus 2 store the personal information which the certification apparatus 2 has certified to a user and register the user. When a user presented password sent from the portable telephone 5 to the certification apparatus 2 coincides with a password stored in personal information as a part thereof and the user who is operating the telephone 5 is specified to be the same user who has been registered, the certification apparatus 2 sends the adult certification data D9 certifying that the user is an adult on the basis of a previously certified personal information to the portable telephone 5. Consequently, unfair use of certification information by a third party can almost surely be prevented by making a portable terminal apparatus used by a user acquire the certification information certifying the personal information in response to a request. Thereby, a certification system which can almost surely prevent unfair use by a third party can be realized.

Incidentally, in the above-mentioned embodiment is described the case where the certification apparatus 2 composed of a personal computer issuing certification information is adopted as a certification apparatus. However, the present invention is not limited to such a case. Various certification apparatus capable of issuing certification information can widely be adopted such as a certification apparatus managed and controlled by an enterprise vending a commodity by means of the vending machine 6 or by an enterprise manufacturing the commodity, a database apparatus in which a portable telephone company with which the user is contracted registered the personal information of the user in advance, and the like.

Moreover, in the above-mentioned embodiment is described the case where the portable telephone 5 is adopted as the portable terminal apparatus. However, the present invention is not limited to such a case. The present invention can adopt other various portable terminal apparatus such as a personal handy-phone system (PHS), a personal digital assistant (PDA) using a wireless communication function, a notebook type personal computer and the like as long as they can acquire certification information.

Moreover, in the above-mentioned embodiment is described the case where registration means for registering personal information certified to a user certifies and registers the user by inquiring the user to the user database apparatus (not shown) of a portable telephone company when registration application information is given to the certification apparatus. However, the present invention is not limited to such a case. The present invention can use other various registration means such as one performing the registration at a registration window at the time of the registration to the certification apparatus 2.

Moreover, in the above-mentioned embodiment is described the case where the user information storage section 8 composed of a hard disk drive as storage means for storing personal identification information inherent to a user. However, the present invention is not limited to such a case. The present invention can widely adopt other various storage means such as personal identification information storage means using a ROM, a RAM, a magneto-optical disk, a magnetic disk and the like as long as it can store personal identification information inherent a user.

Moreover, in the above-mentioned embodiment is described the case where the network interface 9 is used as request reception means for receiving presented personal identification information sent from the portable terminal apparatus and personal information certification request for requesting the certification of the personal information of a user. However, the present invention is not limited to such a case. The present invention can widely adopt other various request reception means such as request reception means performing reception with an antenna and a communication circuit as long as it can receive presented personal identification information and a personal information certification request.

Moreover, in the above-mentioned embodiment is described the case where the certification apparatus control section 7 is adopted as judgment means for judging whether personal identification information coincides with presented personal identification information or not. However, the present invention is not limited to such a case. The present invention can widely adopt judgment means of other various configurations such as a CPU and a microprocessor as long as it can judge whether personal identification information coincides with presented personal identification information or not.

Moreover, in the above-mentioned embodiment is described the case where the network interface 9 is adopted as information sending means for sending certification information certifying the personal information of a user in response to a personal information certification request to a portable terminal apparatus. However, the present invention is not limited to such a case. The present invention can widely adopt other various information sending means such as an antenna and a communication circuit for sending certification information certifying the personal information of a user in response to a personal information certification request to the portable terminal apparatus.

Moreover, in the above-mentioned embodiment is described the case where the input section 17 composed of the operation keys of the portable telephone 5 is adopted as input means for entering presented personal identification information. However, the present invention is not limited to such a case. The present invention can widely adopt other input means having various configurations such as a touch panel, pointing device and the like as long as it can enter presented personal identification information.

Moreover, in the above-mentioned embodiment is described the case where the communication processing section 18 and the antenna element 21 are adopted as information reception means for receiving the certification information sent from the certification apparatus. However, the present invention is not limited to such a case. The present invention can widely adopt other various information reception means as long as they can sent input personal identification information to a certification apparatus.

Moreover, in the above-mentioned embodiment is described the case where the antenna element 21 and the communication processing section 18 are adopted as certification information reception means for receiving certification information from the certification apparatus. However, the present invention is not limited to such a case. The present invention can widely adopt other various certification information reception means as long as they can receive certification information from a certification apparatus.

Moreover, in the above-mentioned embodiment is described the case where the discount point data D32, the present point data D33 and the like are sent from the vending machine 6 to the certification apparatus 2 through the portable telephone 5. However, the present invention is not limited to such a case. The present invention may adopt the configuration in which the discount point data D32 and the present point data D33 are previously stored in the vending machine 6 and the discount point data D32 and the present point data D33 are collected with a point of sales (POS) terminal of a service person of a dealer managing the vending machine 6. By such a configuration, it becomes unnecessary to provide the function of sending the discount point data D32 and the present point data D33 from the vending machine 6 to the portable telephone 5. Consequently, it becomes possible to make the circuit configuration of the vending machine 6 simpler.

Moreover, in the above-mentioned embodiment is described the case where a password and a user presented password are adopted as the personal identification information inherent to a user and the presented personal identification information, respectively. However, the present invention is not limited to such a case. The present invention can widely adopt fingerprint information, the personal identification information inherent a user and the presented personal identification information which only the user can know or own.

Moreover, in the above-mentioned embodiment is described the case where adult certification information certifying being an adult is adopted as the certification information for certifying personal information. However, the present invention is not limited to such a case. The present invention can widely adopt other various pieces of information such as the age, the distinction of sex, the address and the like of a user as the certification information as long as the information can be used as the certification information for certifying the personal information.

Moreover, in the above-mentioned embodiment is described the case where the vending machine 6 dealing with a commodity which is not permitted to be vended to an underage user (hereinafter referred to as an underage prohibited commodity) is adopted as the commodity vending apparatus. However, the present invention is not limited to such a case. The present invention can widely adopt other various commodity vending apparatus such as a ticket-vending machine vending a ticket of a movie to a student at a student price after the certification of being a student as long as they can vend a commodity after certification.

Figure 9:
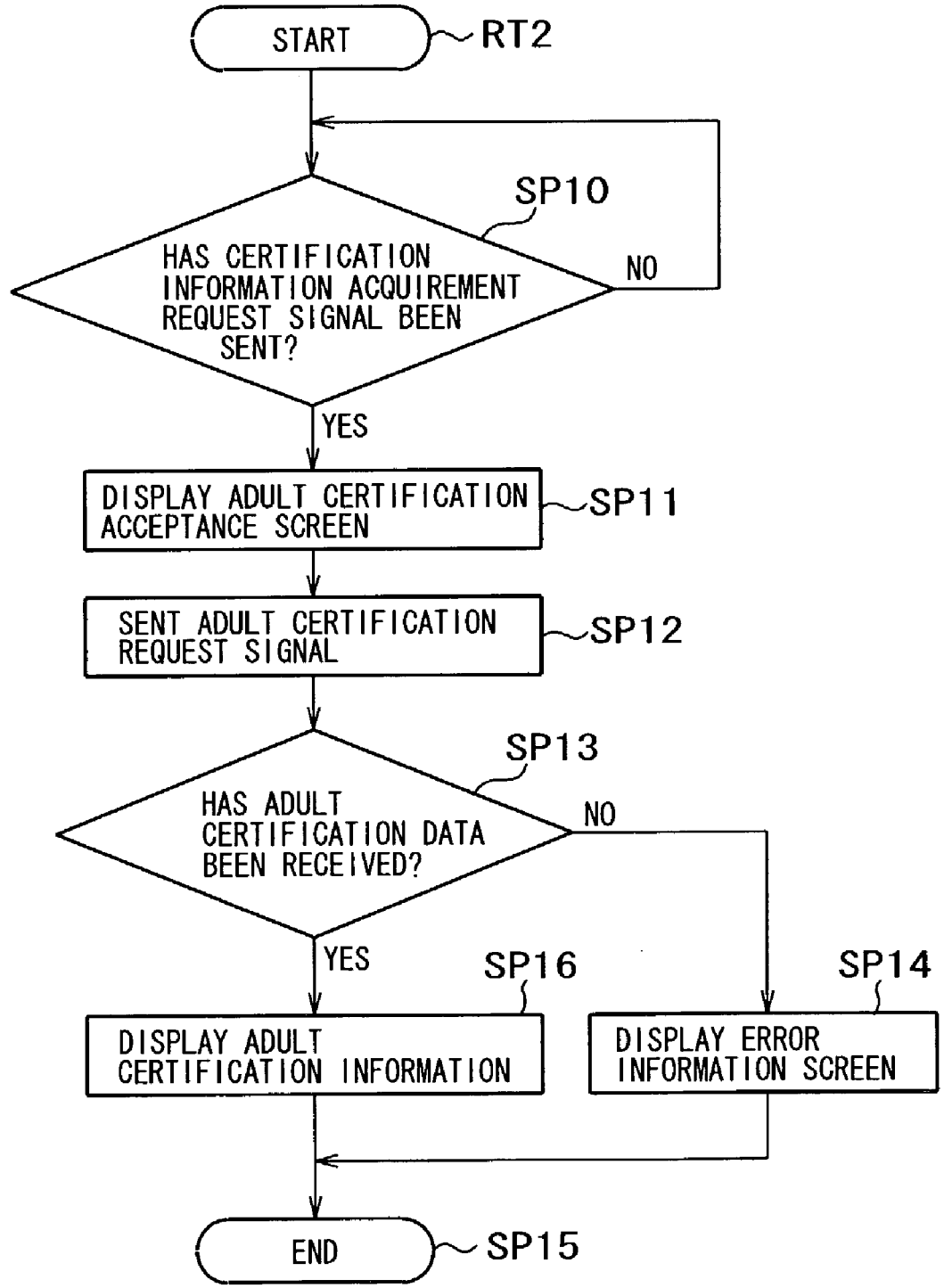
FIG. 9 is a flow chart showing an adult certification information acquisition process procedure of the portable telephone.
Figure 10:
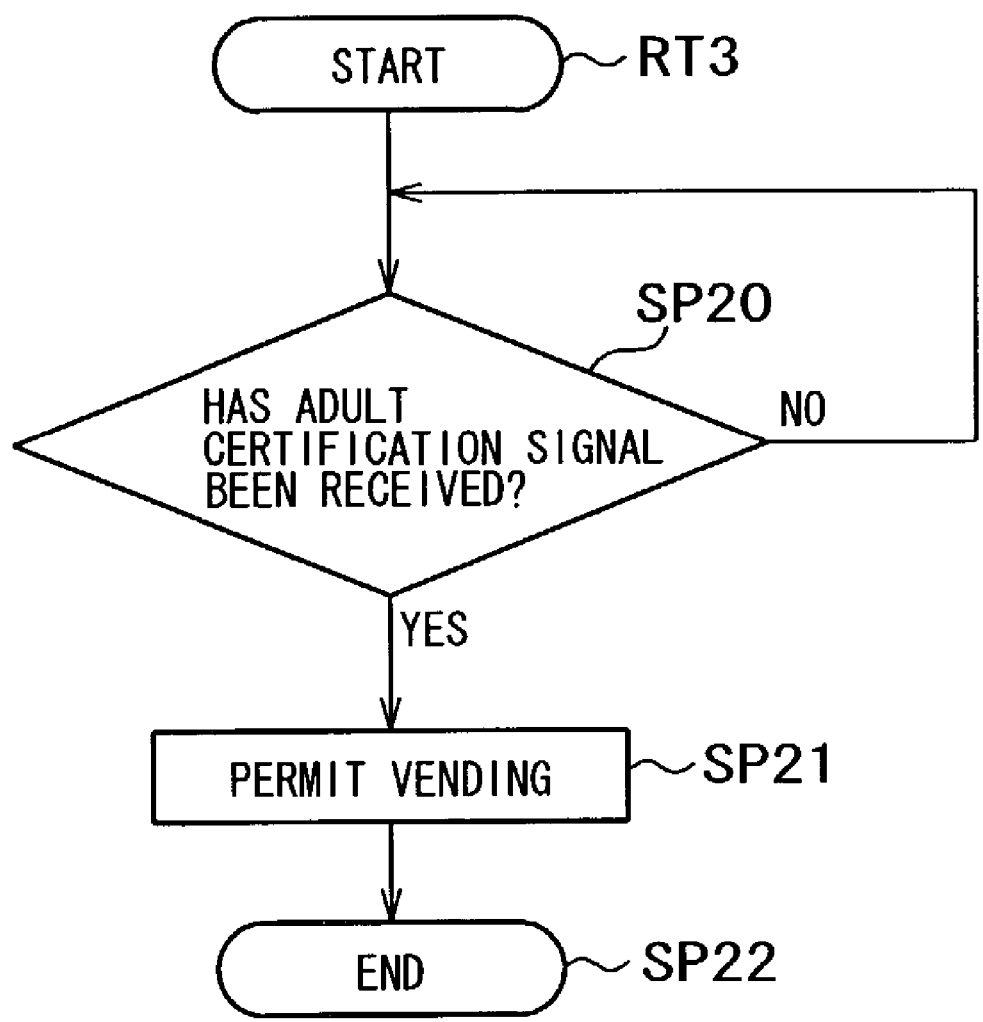
FIG. 10 is a flow chart showing an underage prohibited commodity purchase permission process procedure of the vending machine.

Moreover, in the above-mentioned embodiment is described the case where the certification apparatus 2 executes the above-mentioned series of processes shown in FIG. 8 in accordance with an adult certification program stored in the ROM in advance and the portable telephone 5 executes the above-mentioned series of processes shown in FIG. 9 in accordance with an adult certification information acquirement program stored in the ROM in advance and further the vending machine 6 executes the above-mentioned series of processes shown in FIG. 10 in accordance with a commodity vending program stored in the ROM in advance. However, the present invention is not limited to such a case. The present invention may adopt the configuration in which the above-mentioned series of processes are executed by means of the following. That is, a program storage medium storing an adult certification program is installed in the certification apparatus 2, a program storage medium storing an adult certification information acquirement program is installed in the portable telephone 5, and a commodity vending program storage medium storing a commodity vending program is installed in the vending machine 6.

Then, the certification program storage medium, the certification information acquirement program storage medium and the commodity vending program storage medium, which install the certification program, the certification information acquirement program and the commodity vending program for executing the above-mentioned series of processes into the certification apparatus 2, the portable telephone 5 and the vending machine 6 to make them to be in an executable state, respectively, can be realized not only by a package medium such as a flexible disk, a compact disc read only memory (CD-ROM), a digital versatile disc (DVD) and the like, but also by a semiconductor memory, a magnetic disk and the like in which programs are temporarily or eternally stored. Moreover, a local area network, the Internet, and a wired or wireless communication medium such as digital broadcast satellite may be used as means for storing the certification program, the certification information acquirement program and the commodity vending program into the program storage media, and these programs may be installed through various communication interfaces such as a router, a modem and the like.

What is claimed is:

1. A certification system including a certification apparatus, a portable terminal apparatus, and a commodity vending apparatus, wherein said certification apparatus comprises:
registration means for registering personal information certified to a user;
storage means for storing personal identification information inherent to said user;
request reception means for receiving presented personal identification information sent from said portable terminal apparatus, and a personal information certification request requesting certification of said personal information of said user;
judgment means for judging whether said personal identification information coincides wit said presented personal identification information; and
information sending means for sending certification information certifying said personal information of said user in response to said personal information certification request to said portable terminal apparatus when said personal identification information coincides with said presented personal identification information as a result of a judgment of said judgment means,
wherein said portable terminal apparatus is a portable telephone which comprises:
a display operable to display information thereon;
input means for entering said presented personal identification information;
request sending means for sending said presented personal identification information and said personal information certification request to said certification apparatus;
information reception means for receiving said certification information sent from said certification apparatus as a result of sending said presented personal identification information and said personal information certification request to said certification apparatus;
certification information transmitting means for transmitting said certification information to said commodity vending apparatus;
means for causing the received certification information to be displayed on said display;
means for erasing said certification information and the presented personal identification information and a password after completion of a purchase; and
wherein said commodity vending apparatus comprises:
certification information receiving means for receiving said certification information from said portable terminal apparatus; and
purchase permission judgment means for judging whether purchase of a prescribed commodity is permitted on a basis of said certification information.

2. The certification system according to claim 1,
wherein said certification apparatus further comprising:
discrimination means for discriminating a classification to which said personal information of said user in response to said personal information certification request belongs when said personal identification information coincides with said presented personal identification information as a result of a judgment of said judgment means; and wherein said information sending means sends said certification information certifying said classification discriminated by said discrimination means to said portable terminal apparatus when said personal identification information coincides with said presented personal identification information as a result of a judgment of said judgment means.

3. A portable terminal apparatus comprising:
a display operable to display information thereon;
input means for entering presented personal identification information;
request sending means for sending said presented personal identification information and a personal information certification request requesting certification of personal information of a user to a certification apparatus which registers said personal information certified to said user and stores personal identification information inherent to said user;
information reception means for receiving certification information sent from said certification apparatus at a time when said personal identification information coincides with said presented personal identification information as a result of a comparison of said personal identification information with said presented personal identification information, said certification information certifying said personal information of said user in response to said personal information certification to enable the user to complete a transaction;
certification information transmitting means for transmitting said certification information to a commodity vending apparatus;
means for causing the received certification information to be displayed on said display; and
means for erasing said certification information and the presented personal identification information and a password after completion of said transaction.

4. The portable terminal apparatus according to claim 3,
wherein said information reception means receives said certification information sent from said certification apparatus at the time when said personal identification information coincides with said presented personal identification information, said certification information certifying a classification to which said personal information of said user in response to said personal information certification request belongs.

5. The portable terminal apparatus according to claim 4,
wherein said information reception means receives said certification information sent from said certification apparatus, said certification information being a standard in order to acquire permission of purchasing a commodity from a prescribed commodity vending apparatus.

6. A commodity vending apparatus comprising:
certification information reception means for receiving certification information certifying personal information of a user in response to a personal information certification request sent from a portable terminal apparatus after acquirement of said personal information certification request from a certification apparatus by said portable terminal apparatus when personal identification information coincides with presented personal identification information, said portable terminal apparatus registering said personal information certified to said user and having sent said presented personal identification information and said personal information certification request requesting certification of said personal information of said user to said certification apparatus storing said personal identification information inherent to said user; and purchase permission judgment means for judging whether said commodity vending apparatus permits purchase of a prescribed commodity or not on a basis of said certification information, wherein said portable terminal apparatus is a portable telephone having a display operable to display information thereon, certification information transmitting means for transmitting said certification information to said commodity vending apparatus, means for causing the received certification information to be displayed on said display, and means for erasing said received certification information and the presented personal identification information and a password after completion of said purchase.

7. A commodity vending method comprising:

a certification information recption step of receiving certification information certifying personal information of a user in response to a personal information certification request sent from a portable terminal apparatus after acquirement of said personal information certification request from a certification apparatus by said portable terminal apparatus when personal identification information coincides with presented personal identification information, said portable terminal apparatus registering said personal information certified to said user and having sent said presented personal identification information and said personal information certification request requesting certification of said personal information of said user to said certification apparatus storing said personal identification information inherent to said user; and a purchase permission judgment step of judging whether said commodity vending apparatus permits purchase of a prescribed commodity or not on a basis of said certification information, wherein said portable terminal apparatus is a portable telephone having a display operable to display information thereon, a certification information transmitting step for transmitting said certification information to said commodity vending apparatus, a step for causing the received certification information to be displayed on said display, and further comprising the step of erasing said certification information and the presented personal identification information and a password after completion of said purchase.

8. A commodity vending program for making a commodity vending apparatus execute, said commodity vending program comprising:

a certification information reception step of receiving certification information certifying personal information of a user in response to a personal information certification request sent from a portable terminal apparatus after acquirement of said personal information certification request from a certification apparatus by said portable terminal apparatus when personal identification information coincides with presented personal identification information, said portable terminal apparatus registering said personal information certified to said user and having sent said presented personal identification information and said personal information certification request requesting certification of said personal information of said user to said certification apparatus storing said personal identification information inherent to said user; and a purchase permission judgment step of judging whether said commodity vending apparatus permits purchase of a prescribed commodity or not on a basis of said certification information, wherein said portable terminal apparatus is a portable telephone having a display operable to display information thereon, a certification information transmitting step for transmitting said certification information to said commodity vending apparatus, a step for causing the received certification information to be displayed on said display, and further comprising the step of erasing said certification information and the presented personal identification information and a password completion of said purchase.

9. A commodity vending program storage medium for making a commodity vending program execute, said commodity vending program comprising:

a certification information reception step of receiving certification information certifying personal information of a user in response to a personal information certification request sent from a portable terminal apparatus after acquirement of said personal information certification request from a certification apparatus by said portable terminal apparatus when personal identification information coincides with presented personal identification information, said portable terminal apparatus registering said personal information certified to said user and having sent said presented personal identification information and said personal information certification request requesting certification of said personal information of said user to said certification apparatus storing said personal identification information inherent to said user; and a purchase permission judgment step of judging whether said commodity vending apparatus permits purchase of a prescribed commodity or not on a basis of said certification information, wherein said portable terminal apparatus is a portable telephone having a display operable to display information thereon, a certification information transmitting step for transmitting said certification information to said commodity vending apparatus, a step for causing the received certification information to be displayed on said display, and further comprising the step of erasing said certification information and the presented personal identification and a password after completion of said purchase.

* * * * *